United States Patent
Pandey et al.

(10) Patent No.: US 10,680,880 B2
(45) Date of Patent: Jun. 9, 2020

(54) CLOUD IMPLEMENTATION ORCHESTRATION

(71) Applicant: ENTIT SOFTWARE LLC, Sanford, NC (US)

(72) Inventors: Rajeev Pandey, Corvallis, OR (US); Matthew Farina, Highland, MI (US)

(73) Assignee: MICRO FOCUS LLC, Santa Clara, CA (US)

( * ) Notice: Subject to any disclaimer, the term of this patent is extended or adjusted under 35 U.S.C. 154(b) by 685 days.

(21) Appl. No.: 14/170,404

(22) Filed: Jan. 31, 2014

(65) Prior Publication Data

US 2015/0222694 A1 Aug. 6, 2015

(51) Int. Cl.
- G06F 15/177 (2006.01)
- H04L 12/24 (2006.01)
- G06F 9/50 (2006.01)

(52) U.S. Cl.
CPC ........ *H04L 41/0803* (2013.01); *G06F 9/5072* (2013.01); *H04L 41/5041* (2013.01)

(58) Field of Classification Search
CPC .............................. H04L 47/2408; G06F 21/62
See application file for complete search history.

(56) References Cited

U.S. PATENT DOCUMENTS

| | | | |
|---|---|---|---|
| 2011/0138047 A1 | 6/2011 | Brown et al. | |
| 2011/0295998 A1 | 12/2011 | Ferris et al. | |
| 2012/0054626 A1* | 3/2012 | Odenheimer | G06F 9/5072 715/738 |
| 2012/0124211 A1* | 5/2012 | Kampas et al. | 709/226 |
| 2012/0290460 A1 | 11/2012 | Curry et al. | |
| 2013/0254897 A1* | 9/2013 | Reedy | G06F 21/6218 726/26 |
| 2013/0262801 A1* | 10/2013 | Sancheti et al. | 711/162 |
| 2014/0074973 A1* | 3/2014 | Kumar et al. | 709/217 |
| 2014/0075031 A1* | 3/2014 | Doering et al. | 709/226 |
| 2014/0280961 A1* | 9/2014 | Martinez et al. | 709/226 |

OTHER PUBLICATIONS

Cloud Central Enterprise. http://www.cloudcentral.com.au/solutions/enterprise/.

* cited by examiner

*Primary Examiner* — Umar Cheema
*Assistant Examiner* — Tesfu N Mekonen

(57) ABSTRACT

In one implementation, a cloud orchestration system can comprise a solution engine, a configuration engine, and an implementation engine. The solution engine can receive an implementation selection of a service. The implementation selection can be based on a plurality of implementations of a cloud to provide the service. The configuration engine can obtain configuration information associated with the implementation selection. The implementation engine can communicate with an endpoint of the service based on the implementation selection and the configuration information. In another implementation, a method for orchestration of a cloud can comprise receiving an implementation selection for a solution of a service, collecting configuration information associated with the implementation selection, instantiating the solution based on the implementation selection and the configuration information, and providing connection information associated with the solution.

19 Claims, 4 Drawing Sheets

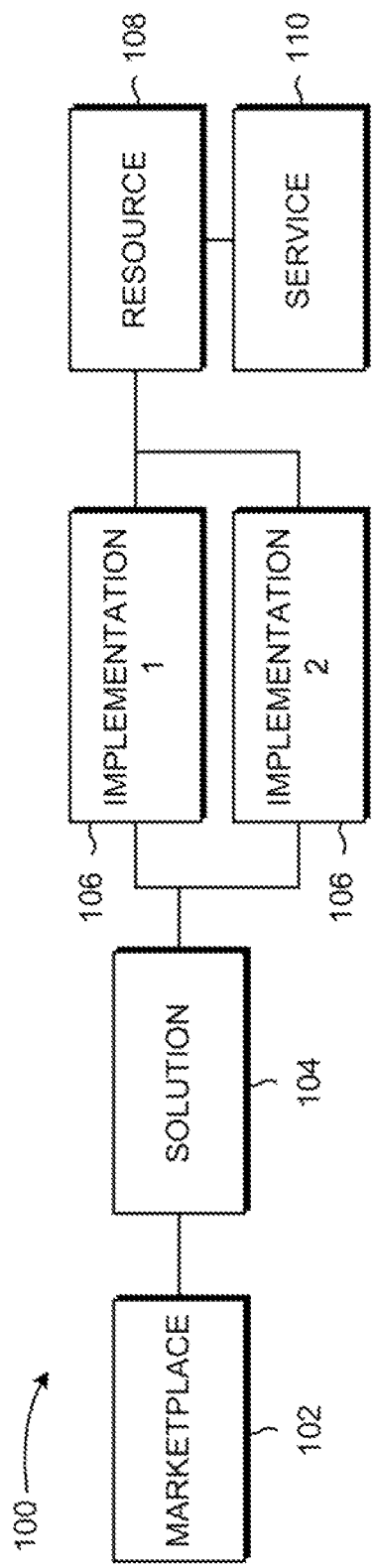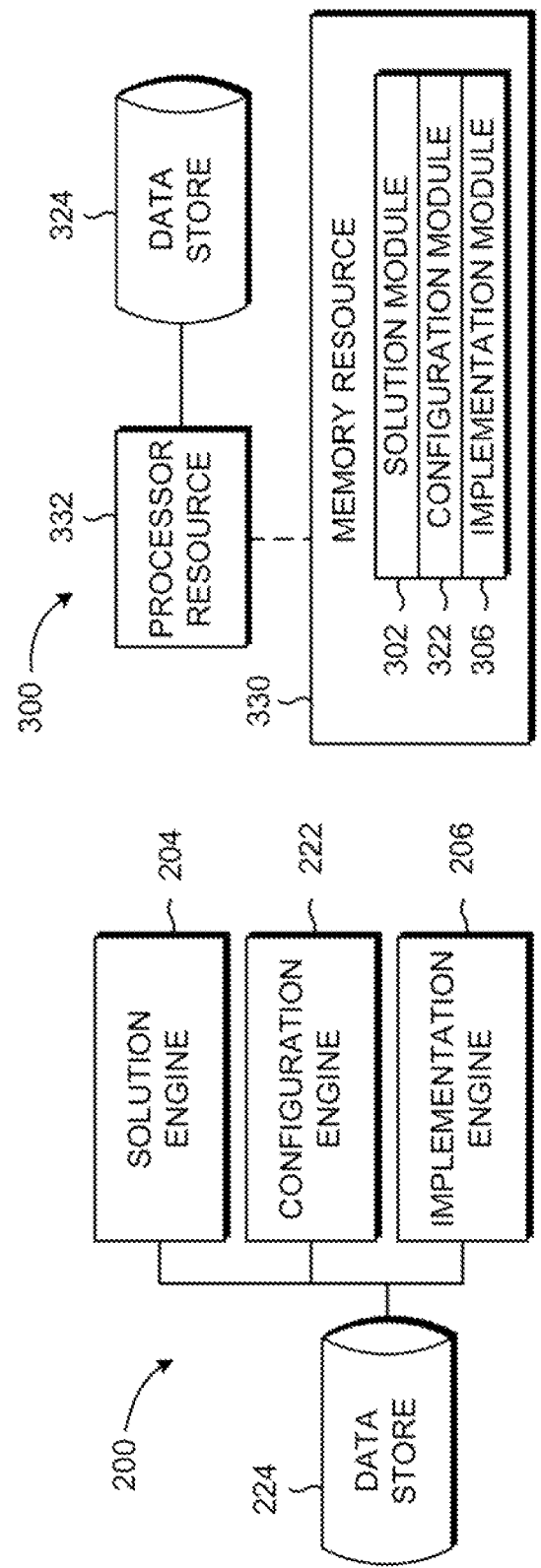

CLOUD IMPLEMENTATION ORCHESTRATION

BACKGROUND

A computer can execute an application to provide a service. A service can be provided via a distributed computing model. For example, an application can exist on a shared pool of resources, referred to herein as a "cloud," for access by a client computer. Cloud-based services are said to execute or reside "on the cloud." The resources of the cloud can be virtual instances of resources, such as a virtual machine instance. The cloud can be structured, or otherwise configured, to provide the service based on a cloud service model, such as software as a service ("SaaS"), platform as a service ("PaaS"), and infrastructure as a service ("IaaS").

BRIEF DESCRIPTION OF THE DRAWINGS

FIGS. 1-3 are back diagrams depicting example cloud orchestration systems.

DETAILED DESCRIPTION

Figure 4:
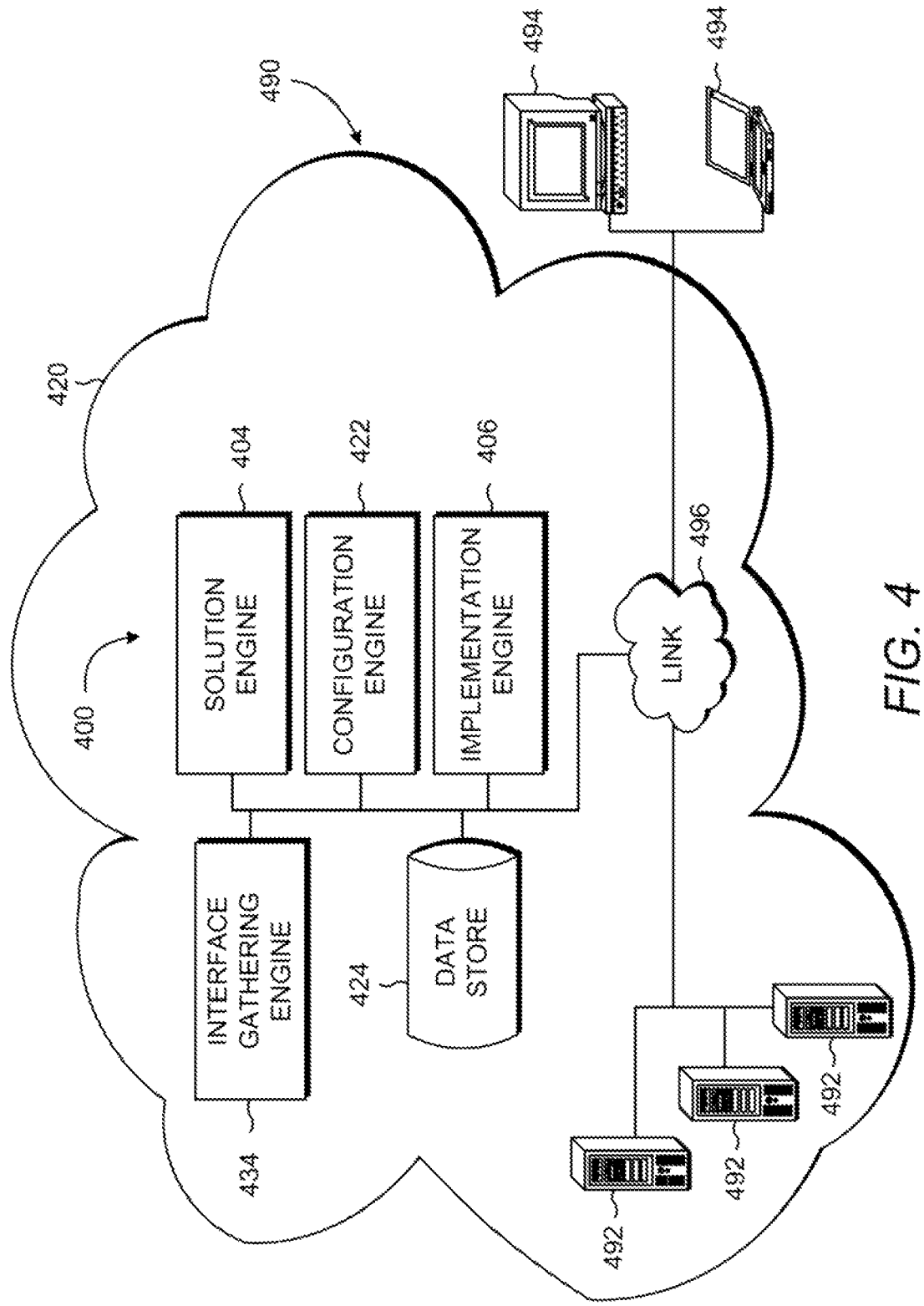
FIG. 4 depicts example environments in which various example cloud orchestration systems can be implemented.

In the following description and figures, some example implementations of cloud orchestration systems and/or methods are described. As used herein, a cloud is any appropriate combination of physical and virtual resources pooled for computing and/or storage purposes. For example, a cloud may include any appropriate number of individual resources, servers, and server groups (referred to herein as "clusters") including virtual instances of resources, servers, and server groups. A resource, as used herein, is any appropriate allocable aspect of the cloud, such as a compute resource or other resource associated with cloud computing. For example, a resource can include a virtual machine instance, a location in memory, a virtual central processing unit ("CPU"), a cluster of servers, a SaaS organization, a PaaS container, a script, or other cloud computing resource or part thereof. A service, as used herein, is any appropriate supplying of communication, transmissions, software, storage, or any other product, resource, or activity that is capable of executing on a network of electronic devices.

Cloud-based services can be offered via various implementations of the cloud. As mentioned above, cloud-service models can include SaaS, PaaS, IaaS, and variations on those models. Other examples of options for implementations of a cloud-based service include allocation of a virtual machine ("VM") instance based on an image, providing a multi-node cluster based on a deployment framework, and sending parameters to an application that performs the cloud configuration and provides the service. A cloud service can provide access to applications based on various interfaces, such as application programming interfaces ("API"), where parameters for the implementation option can be passed to configure the cloud. An application, as used herein, is a set of executable instructions to provide a service, such as a computer program. Cloud providers commonly provide applications based on a single service model and restrict offerings available under other implementations.

Various examples described below relate to orchestrating a cloud based on an implementation selection. A cloud provider can orchestrate multiple service solutions based on the implementation options available for the solution. By centralizing implementation options and associated methods of communication with the service, a cloud provider can orchestrate the multiple solutions on a single cloud. By creating a single interface to communicate with the service and configuration, the customers of cloud service providers can receive a service with a variety of implementation options and select the implementation that fits the customer's desires.

FIGS. 1-3 are block diagrams depicting example cloud orchestration systems. Referring to FIG. 1, an example cloud orchestration system 100 generally comprises a solution 104 and implementations 106 associated with that solution 104. The cloud orchestration system 100 can allocate a resource 108 to provide the service 110 based on the selected implementation 106. For example, a software module can be programmed to communicate with the service 110 and the configuration to orchestrate the service 110 on the cloud. The cloud orchestration system 100 can include a marketplace 102 to provide the solutions 104 and implementations 106 available by a cloud service provider. The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based only on the stimulus or a combination of stimuli including the stimulus.

The marketplace 102 can cause a catalog of solutions 104 to present to a user. For example, a user may land on a website describing the solution 104 in the marketplace 102. The marketplace 102 can be a website, a mobile application, or other computing mechanism to format output to display the solution options for a customer. Each solution 104 can have a plurality of implementation options. For example, a solution 104 can be installed as a single VM image, installed via script, or provided as PaaS. The user can select an available implementation 106. The cloud orchestration system 100 understands the implementation 106, the configuration options, and how to communicate with the service 110 in order to coordinate resources 108 to orchestrate the solution 104. A resource 108 of the cloud can be allocated based on the selected implementation 106. Allocation, and variations thereof used herein, includes creation, maintenance, modification, and/or management of a resource, such as adding, modifying, reassigning, and/or deleting virtual resource.

The cloud orchestration system 100 can obtain configuration information to orchestrate the solution 104. For example, a user can be asked how many seats are desired for the service 110. Once cloud configuration is complete, the user can be informed, directed, connected, or otherwise provided with connection information to utilize the service 110 via the solution 104. The cloud orchestration system 100 allows for solutions 104 having various implementations 106 to execute on a single cloud and allows a single cloud provider to offer a solutions 104 having a variety of implementation possibilities. The cloud orchestration system 100 also allows for a customer to select a solution 104 according to the implementation 106 desired without restriction to a single cloud service model.

Referring to FIG. 2, an example cloud orchestration system 200 can generally comprise a solution engine 204, a configuration engine 222, and an implementation engine

206. In general, the implementation engine 206 can communicate with the cloud to implement the selected implementation option received by the solution engine 204 based on configuration information collected by the configuration engine 222.

The solution engine 204 represents any combination of circuitry and executable instructions to receive an implementation selection of a service. An implementation selection is a selection of an implementation option for a solution to provide a service. For example, a particular cloud service model can be selected as an implementation option to configure the cloud and provide the service via that cloud service model. The implementation option can be a type of configuration of the cloud. For example, the cloud can be configurable to provide the service via a plurality of cloud service models and the service can be provisioned by the cloud based on an implementation option. Cloud implementations can include single or multiple VM instances, SaaS, PaaS, IaaS, cluster configurations, application-based configurations, scripted installations, complex orchestrations, and the like.

The implementation selection can be based on a plurality of implementations of a cloud to provide the service. For example, the implementation selection can be a selected implementation of a plurality of implementations presented to a user at a marketplace. The implementation selection and/or the plurality of implementations can be based on availability of an implementation for a solution. For example, if a publishing solution is available as either a single VM instance or a PaaS cluster, a user could select one of the plurality of implementations. The solution engine 204 can cause to present the plurality of implementations for selection by a user via the marketplace, such as marketplace 102 of FIG. 1. The implementation selection can be a default selection or a predefined selection for the solution.

The solution engine 204 can contain a plurality of solution categories. The solution categories can have a commonality among service models. For example, the commonality can be based on the interface with the service. The solution engine 204 can receive interface information related to the implementation options from an interface gathering engine, such as interface gathering engine 434 of FIG. 4. The interface gathering engine is described in more detail with the description of FIG. 4.

The configuration engine 222 represents any combination circuitry and executable instructions to obtain configuration information associated with the implementation selection. Configuration information can be any appropriate data associated with properties or configuration of the solution, the implementation selection, and/or the cloud to provide the service. For example, a database solution can request a storage size for a database service and an email solution can request a number of emails sent during a determined time period. The configuration information can be used to implement the details of the solution based on the implementation selection. The quantity and type of configuration information can vary based on the solution and/or the implementation selection. Some examples of configuration information can include a storage size, an application cluster size, a number of seats of the service, a number of API transactions, a number of queries, a number of messages, and data associated with a particular solution.

The configuration engine 222 can obtain configuration information from at least one of a response to a set of configuration questions and a predefined default associated with the implementation selection. For example, the configuration engine 222 can cause a set of configuration questions to be presented to a user and receive responses from a set of configuration questions for use by the implementation engine 204 to configure the cloud or otherwise orchestrate the solution. The configuration engine 222 can obtain configuration information in response to a user's interaction with a graphical user interface ("GUI") and/or via predefined defaults from a user, a solution, and/or the cloud orchestration system 200. For example, the configuration engine 222 can cause a form to present on a GUI to receive user-based configuration information specific to the selected implementation for cloud configuration and/or service personalization. The configuration engine 222 can determine the information to use to complete orchestration of the solution. For example, a user may enter predefined defaults for solutions, and the cloud orchestration system 200 can cause a request to the user for any missing information to complete the cloud configuration based on the specification of the application to provide the service.

The configuration information obtained by the configuration engine 222 can be placed into a configuration payload to provide to the service. The configuration payload represents the configuration information formatted in an accessible form for the service, such as a format in accordance with an API protocol associated with the service and/or implementation option. The configuration payload can include a configuration file, template, parameters, and/or other formats transmittable via computer network. For example, the configuration payload can be one of a virtual machine image, a set of parameters based on the configuration information, and a template file based on the configuration information. The format of the configuration information can be identified by the configuration engine 222. The configuration engine 222 can create, modify, or otherwise maintain the configuration payload to a format compatible with the interface of the implementation selection. The configuration engine 206 can maintain the configuration payload to communicate the configuration information via an API to the endpoint determined, by the implementation engine 206.

The implementation engine 206 represents any combination of circuitry and executable instructions to communicate with an endpoint of the service based on the implementation selection and the configuration information. The implementation engine 206 can gather the appropriate interface and information related to configuration and implementation to initiate, manage, request, or otherwise allocate a resource of the cloud to orchestrate the solution. For example, the implementation engine 206 can create a template file or other configuration payload to transfer via an API to the appropriate endpoint based on the implementation selection. The implementation engine 206 can identify the endpoint to communicate with based on a set of information collected, such as the implementation selection received by the solution engine 204 and the configuration information obtained by the configuration engine 222. An endpoint can include a server device, a virtual machine, an application, an interface, and/or similar entity capable of receiving the information used to configure the cloud based on the selected implementation. The implementation engine 206 can send the configuration payload to the endpoint or otherwise make the configuration payload accessible to the service.

The service can allocate a resource of the cloud based on the configuration information and the implementation selection. The implementation engine 206 can cause the resource to be allocated to the service via an interface based on the cloud service model of the implementation selection. For example, the interface can be an API and the implementation engine 206 can cause a set of specifications and parameters to be passed via the interface of the service used on the configuration information.

The data store 224 can store data used by or otherwise associated with the cloud orchestration system 200. Specifically, the data store can store data used or produced by the solution engine 204, the configuration engine 222, and the implementation engine 206, such as implementations, configuration information, interface information, and endpoints.

FIG. 3 depicts the example cloud orchestration system 300 can be implemented on a memory resource 330 operatively coupled to a processor resource 332. The processor resource 332 can be operatively coupled to a data store 324. The data store 324 can be the same as data store 224 of FIG. 2.

Referring to FIG. 3, the memory resource 330 can contain a set of instructions that can be executable by the processor resource 332. The set of instructions can implement the system 300 when executed by the processor resource 332. The set of instructions stored on the memory resource 330 can be represented as a solution module 304, a configuration module 322, and an implementation module 306. The processor resource 332 can carry out the set of instructions to execute the solution module 304, the configuration module 322, and the implementation module 306, and/or any appropriate operations among and/or associated with the modules of the system 300. For example, the processor resource 332 can carry out a set of instructions to cause an implementation of a service to be presented for selection based on availability of the implementation for the service, obtain configuration information associated with the implementation, and communicate with an endpoint of the service to allocate a resource of the cloud based on the implementation and the configuration information. The solution module 304, the configuration module 322 and the implementation module 306 represent program instructions that when executed function as the solution engine 204, the configuration engine 222 and the implementation engine 206 of FIG. 2, respectively.

The processor resource 332 can be one or multiple CPUs capable of retrieving instructions from the memory resource 330 and executing those instructions. Such multiple CPUs can be integrated in a single device or distributed across devices. The processor resource 332 can process the instructions serially, concurrently, or in partial concurrence, unless described otherwise herein.

The memory resource 330 and the data store 324 represent a medium to store data utilized by the system 300. The medium can be any non-transitory medium or combination of non-transitory mediums able to electronically store data and/or capable of storing a module of the system 300 and/or data used by the system 300. For example, the medium can be a storage medium, which is distinct from a transmission medium, such as a signal. The medium can be machine readable, such as computer readable. The memory resource 330 can be integrated in the same device as the processor resource 332 or it can be separate but accessible to that device and the processor resource 332. The memory resource 330 can be distributed across devices. The data of the data store 324 can include representations of data and/or information mentioned herein, such as configuration information or payloads, interface information, and implementation details. The memory resource 330 and the data store 310 can represent the same physical medium unless otherwise described herein.

In the discussion herein, the engine 204, 206, and 222 of FIG. 2 and the modules 304, 306, and 322 of FIG. 3 have been described as a combination of circuitry and executable instructions. Such components can be implemented in a number of fashions. Looking at FIG. 2, the executable instructions can be processor executable instructions, such as program instructions, stored on the memory resource 330, which is a tangible, non-transitory computer readable storage medium, and the circuitry can be electronic circuitry, such as processor resource 332, for executing those instructions. The memory resource 330 can be said to store program instructions that when executed by the processor resource 332 implements the system 300 of FIG. 3.

In one example, the executable instructions can be part of an installation package that when installed can be executed by processor resource 332 to implement the system 300. In that example, the memory resource 330 can be a portable medium such as a compact disc, digital video disc, a flash drive, or memory maintained by a computer device, such as a cloud device 492 of FIG. 4, from which the installation package can be downloaded and installed. In another example, the executable instructions can be part of an application or applications already installed. Here, the memory resource 330 can include integrated memory such as a hard drive, solid state drive, or the like.

FIG. 4 depicts example environments in which various example cloud orchestration systems 400 can be implemented. The example environment 490 is shown to include an example cloud orchestration system 400. The system 400 (described herein with respect to FIGS. 1-3) can represent generally any combination of circuitry and executable instructions configured to orchestrate a cloud. The system 400 can include a solution module 404, a configuration engine 422, and implementation engine 406, and a data store 424 that are the same as the solution engine 204, the configuration engine 222, the implementation engine 206, and the data store 224 of FIG. 2, respectively, and, for brevity, the associated descriptions are not repeated.

The example system 400 can include an interface gathering engine 434. The interface gathering engine 434 represents any combination of circuitry and executable instructions to gather information related to an interface associated with an implementation option. The interface gathering engine 434 can crawl or otherwise retrieve interface information, such as API protocols, from an endpoint of each implementation option of the solution. The interface gathering engine 434 can aggregate the interface information for access by the cloud orchestration system 200 to communicate with the service based on the selected implementation. The interface information can be used to allocate a resource on the cloud based on the implementation selection and or the configuration information for the implementation selection. The cloud orchestration system 200 can associate implementation options based on the commonality among the interface information.

The example system 400 can be integrated into a cloud device 492 or a client device 494. The system 400 can be distributed across cloud devices 492, client devices 494, or a combination of cloud devices 492 and client devices 494. The environment 490 can include a cloud computing environment, such as a cloud network 420. For example, any appropriate combination of the system 400, cloud device 492, and client device 494 can be a virtual instance of a virtual shared pool of resources. The engines and/or modules herein can reside and/or execute on the cloud. In the example of FIG. 4, a client device 494 can access a cloud device 492. The cloud devices 492 represent generally any computing devices configured to respond to a network request received from the client device 494, whether virtual or real. For example, a cloud device 492 can be a virtual machine of the cloud network 420 providing a service and the client device 494 can be a compute device configured to access the cloud network 320 and receive and/or communicate with the service. A cloud device 494 can include a webserver, an application server, or a data server, for example. The client devices 494 represent generally any compute device configured with a browser or other application to communicate a network request and receive and/or process the corresponding responses. A link 496 represents generally one or any combination of a cable, wireless connection, fiber optic connection, or remote connections via a telecommunications link, an infrared link, a radio frequency link, or any other connectors of systems that provide electronic communication. The link 496 can include, at least in part, intranet, the Internet, or a combination of both. The link 496 can also include intermediate proxies, routers, switches, load balancers, and the like.

Referring to FIGS. 2-4, the engines 204, 206, and 222 of FIG. 2, and/or the modules of 304, 306, and 322 of FIG. 3 can be distributed across cloud devices 492, client devices 494, other devises or storage mediums, or a combination thereof. The engines and/or modules can complete or assist completion of operations performed in describing another engine and/or module. For example, the implementation engine 406 of FIG. 4 can request, complete, or perform the methods and/or operations of the implementation engine 406 as well as the configuration engine 422 and the interface gathering engine 434. The engines and/or modules of the system 400 can perform the example methods described in connection with FIGS. 5-7.

Figure 5:
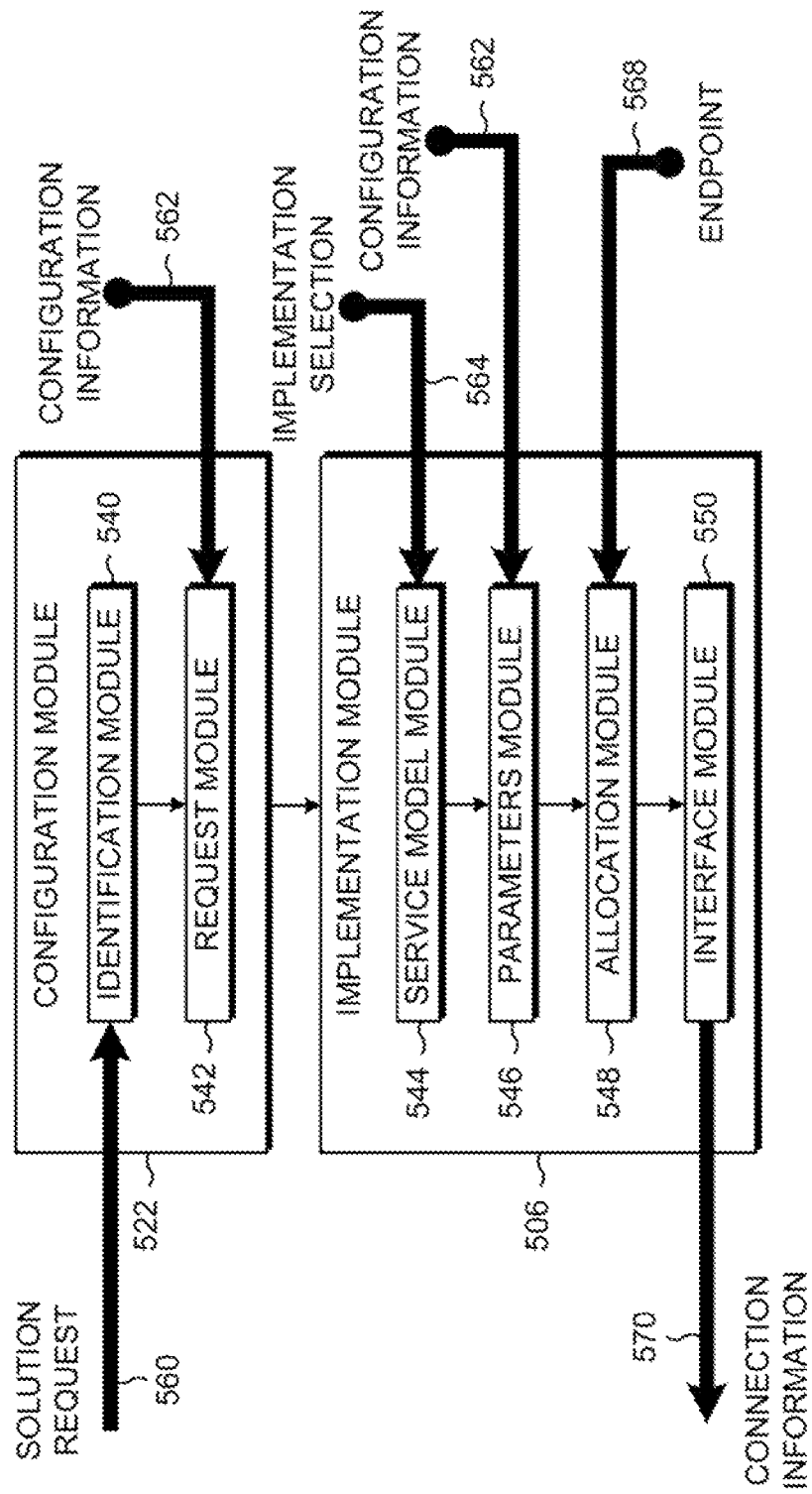
FIG. 5 depicts example modules used to implement example cloud orchestration systems.

FIG. 5 depicts example modules used to implement example cloud orchestration systems. The example modules of FIG. 5 generally include a configuration module 522 and an implementation module 506, which can be the same as the configuration module 322 and the implementation module 306 of FIG. 3, respectively. As depicted in FIG. 5, the example configuration module 522 can include an identification module 540 and a request module 542, and the example implementation module 506 can include a service model module 544, a parameters module 546, an allocation module 548, and an interface module 550.

The identification module 540 represents program instructions that when executed function as a combination of circuitry and executable instructions to identify the configuration information to orchestrate the implementation of a solution request 560. For example, the identification module 540 can access a data store, such as data store 324 of FIG. 3, for configuration information 562 associated with the implementation selection provided with the solution request 560. The identification module 540 can identify configuration information 552 to request from a user.

The request module 542 represents program instructions that when executed function as a combination of circuitry and executable instructions to cause a set of configuration questions to present to a user and retrieve a response to the set of configuration questions. For example, the request module 542 can notify a marketplace, such as marketplace 102 of FIG. 1, to present the user with a request for the identified configuration information 562 by the identification module 540. In that example, the request module 542 can receive the responses to the set of configuration questions from the marketplace.

The service model module 544 represents program instructions that when executed function as a combination of circuitry and executable instructions to identify a configuration of the cloud based on a cloud service model associated with the implementation selection 564. The cloud service model can be any cloud computing model able to provide a service, such as SaaS, PaaS, and IaaS.

The module 546 represents program instructions that when executed function as a combination of circuitry and executable instructions to format a configuration payload based on the configuration information 562 in preparation to send to an endpoint 568. For example, the parameters module 546 can format the configuration information 562 received from the user to be transferred as a configuration payload to en endpoint 568, such as an application, via an interface. Such a format can be based on the interface, such as modifying the configuration information to be accepted by the API to communicate with the endpoint.

The allocation module 548 represents program instructions that when executed function as a combination of circuitry and executable instructions to identify an endpoint 568 and allocate a resource to the solution via the endpoint 568. For example, the allocation module 548 can identify a container to manage a compute cluster and allocate the cluster according to the configuration information 562. For another example, the allocation module 548 can identify the application to be the endpoint 568 and prepare a configuration payload to include a number of seats to be allocated by the application.

The interlace module 550 represents program instructions that when executed function as a combination of circuitry and executable instructions to identify the interface for the solution. The interface for the solution can be based on the service model, the parameters, and the endpoint 568 of the implementation option. For example, the interface module 550 can identify an API protocol associated with the implementation selection 564 using an interface gathering engine, such as interface gathering engine 434 of FIG. 4, and prepare a configuration payload and/or other information to be communicated via the API to the endpoint 568. The interface module 550 can communicate with the endpoint 568 to determine connection information. For example, the interface module 550 can identify the connection information 570 for the user to access the solution once the cloud has been configured according to implementation selection 564. The connection information 570 can be sent to the user. The connection information 570 can be information related to connecting the user to the service and/or the connection to the solution provided on the cloud. For example, the implementation module 506 can register the user with an account for the service based on the configuration information 562 and provide the login information to the user for access via a website associated with the service.

Figure 6:
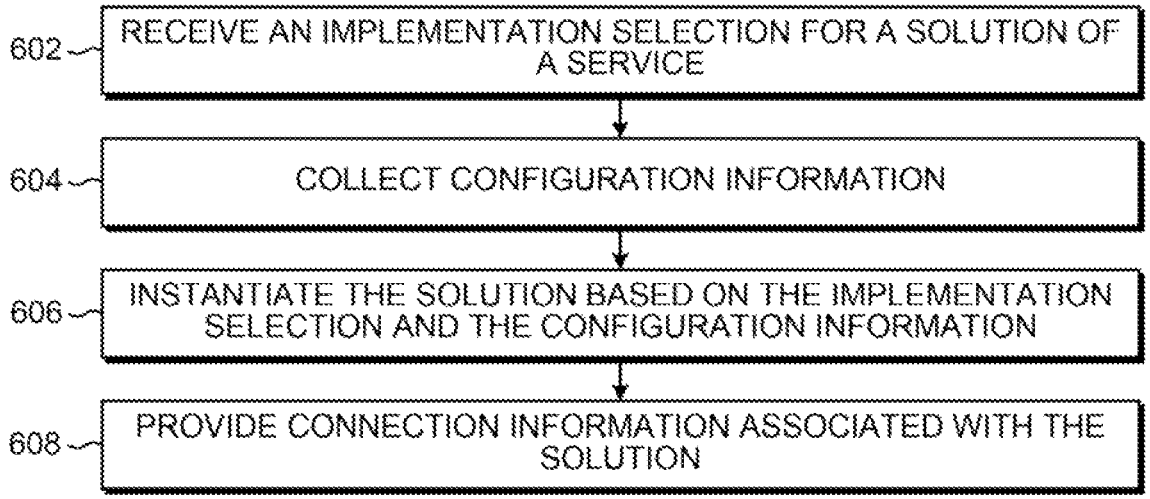
FIGS. 6 and 7 are flow diagrams depicting example methods for orchestration of a cloud.
Figure 7:
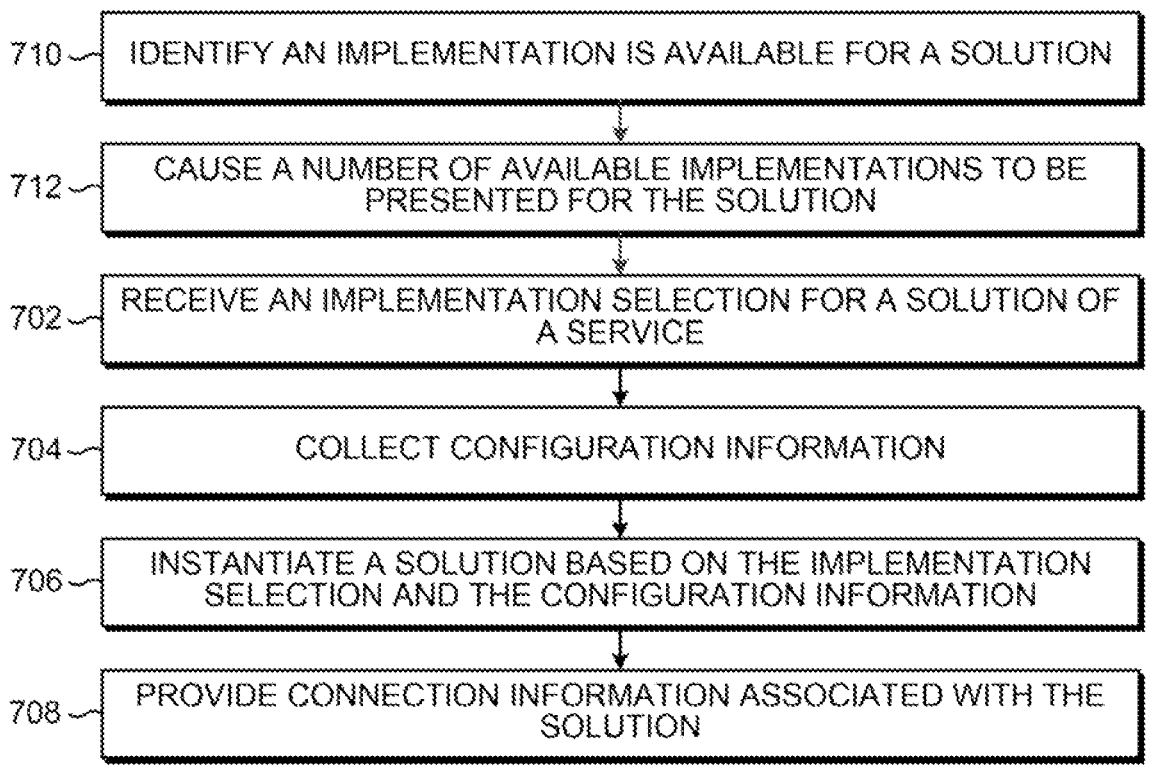

FIGS. 6 and 7 are flow diagrams depicting example methods for orchestration of a cloud. Referring to FIG. 6, example methods for orchestration of a cloud can generally comprise receiving an implementation selection for a solution, collecting configuration information, instantiating the solution, and providing connection information associated with the solution.

At block 602, an implementation selection for a solution of a service is received. The implementation selection can be received from a selection of an implementation option of available implementations for a solution presented to a user, such as via a marketplace. The implementation selection can execute on a cloud configurable to provide the service via a plurality of cloud service models. For example, a database solution can be available via a SaaS service model or an IaaS service model and a user can select one of those options to implement the database application based on the selected option.

At block 604, configuration information is collected. The implementation selection can retrieve predefined user or system defaults to configure the selected implementation appropriately. The configuration information can be obtained from a user, the system, or another source. For example, the configuration information can be collected by causing a request for the configuration information to present to a user. The response from the user can determine the configuration payload to be sent to the endpoint when instantiating the solution. The configuration payload can be maintained based on the configuration information. For example, the configuration payload can be created based on combining predefined defaults and user responses into a transmission to an endpoint based on an API.

At block 606, the solution is instantiated. The solution can be instantiated based on the implementation selection received at block 602 and the configuration information received at block 604. For example, the solution can be instantiated by allocating a resource to the service based on the selected service model and configuring the resource based on a configuration payload containing configuration information. The cloud can be configured via an API based on the configuration information collected at block 604.

At block 608, connection information associated with the solution is provided. The connection information can be a uniform resource locator ("URL"), login information, platform information, port information, duster information, and/or other data used to provide the endpoint of the solution to the user to access the service. The connection information can be provided to cause the user to connect to the service via the solution.

FIG. 7 includes blocks to blocks of FIG. 6 and provides additional blocks and details. In particular, FIG. 7 depicts additional blocks and details generally regarding identifying an implementation is available for a solution and causing a number of available implementations to be presented. Blocks 702, 704, 706, and 708, are the same as blocks 602, 604, 606, and 608 of FIG. 6 and for brevity their respective descriptions have not been repeated.

At block 710, an implementation is identified as available for a solution. An implementation can be identified as available when the solution can be offered under the cloud service model of the implementation. The availability of an implementation can be restricted by the solution provider and or the cloud provider. The endpoint of the service can communicate availability of the implementation as well.

At block 712, a number of available implementations are caused to be presented for the solution. For example, a marketplace can receive a plurality of available implementations and present the options for implementation via a GUI, such as list buttons with the labels of the implementation options. Availability of the implementation option can be indicated such as via an icon, shading, or color to denote enablement.

Although the flow diagrams of FIGS. 5-7 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present invention.

The present description has been shown and described with reference to the foregoing examples. It is understood, however, that other forms, details, and examples may be made without departing from the spirit and scope of the invention that is defined in the following claims.

What is claimed is:

1. A method for orchestration of a cloud, comprising:
causing, by a system comprising a processor, presentation by a marketplace of a plurality of solutions providing different services, each solution of the plurality of solutions including a respective plurality of different implementation options;
receiving, by the system, a user selection of a first solution of the plurality of solutions, the first solution providing a first service to be executed in the cloud, the first solution comprising a specific set of operations accessible by a user;
receiving, by the system, a selection of a selected implementation for the first solution, the selected implementation selected by the user from among a plurality of different implementations of the first solution, the cloud configurable to provide the first solution via a plurality of different configurations of the cloud corresponding to the different implementations of the first solution, and wherein the plurality of different configurations of the cloud comprise different configurations of virtual machines, wherein a first implementation of the plurality of different implementations of the first solution comprises a first configuration of the different configurations of virtual machines, and a second implementation of the plurality of different implementations of the first solution comprises a second, different configuration of the different configurations of virtual machines;
collecting, by the system, configuration information relating to a configuration of the selected implementation;
instantiating, by the system, the first solution based on the selected implementation and the configuration information; and
providing, by the system, connection information associated with the first solution executed on the cloud to provide the first service.

2. The method of claim 1, comprising
causing presentation of the plurality of different implementations of the first solution in a user interface, wherein the selected implementation is responsive to a selection by the user in the user interface.

3. The method of claim 1, further comprising allocating a resource of the cloud based on the configuration information and the selected implementation.

4. The method of claim 1, wherein the connection information comprises information to connect the user to the instantiated first solution.

5. A cloud orchestration system comprising:
a processor; and
a non-transitory storage medium storing instructions executable on the processor to:
cause presentation, by a marketplace, of a plurality of solutions providing different services, each solution of the plurality of solutions including a respective plurality of different implementation options;
receive a user selection of a first solution of the plurality of solutions, the first solution providing a first service to be executed in a cloud, the first solution comprising a specific set of operations accessible by a user;
for the first solution, receive an implementation selection responsive to a selection by the user of a selected implementation from a plurality of different implementations of the first solution, wherein the plurality of different implementations of the first solution comprise a software as a service (SaaS) implementation of the first solution, a platform as a service (PaaS) implementation of the first solution, an infrastructure as a service (IaaS) implementation of the first solution, and implementations implemented with different configurations of virtual machines;

obtain configuration information relating to a configuration of the selected implementation; and communicate with an endpoint of the first service based on the selected implementation and the configuration information, the first service to allocate a resource of the cloud based on the configuration information and the selected implementation.

6. The cloud orchestration system of claim 5, wherein the plurality of solutions comprise multiple solutions selected from among a publishing solution to provide a publishing service, a database solution to provide a database service, and an email solution to provide an email service.

7. The cloud orchestration system of claim 5, wherein the instructions are executable on the processor to cause the resource to be allocated to the first service via an interface based on a cloud service model of the selected implementation.

8. The cloud orchestration system of claim 7, wherein the instructions are executable on the processor to cause a set of specifications and parameters to be passed via the interface of the first service based on the configuration information, the interface being an application programming interface.

9. The cloud orchestration system of claim 5, wherein the instructions are executable on the processor to provide a plurality of solution categories having commonality among service models based on interface information aggregated from an interface gathering system.

10. The cloud orchestration system of claim 5, wherein the instructions are executable on the processor to obtain the configuration information responsive to a set of configuration questions sent to a user.

11. The cloud orchestration system of claim 5, wherein the instructions are executable on the processor to cause presentation of information of the plurality of different implementations of the first solution in a user interface, wherein the implementation selection is responsive to a selection by the user in the user interface from the plurality of different implementations of the first solution.

12. A non-transitory computer readable medium comprising instructions executable by a system comprising a processor to:

cause presentation, by a marketplace, of a plurality of solutions providing different services, each solution of the plurality of solutions including a respective plurality of different implementation options;

receive a user selection of a first solution of the plurality of solutions, the first solution providing a first service to be executed in a cloud, the first solution comprising a specific set of operations accessible by a user;

cause presentation, in a user interface, of a plurality of different implementations of the first solution, wherein the plurality of different implementations of the first solution comprise respective different configurations of the cloud and implementations implemented with different configurations of virtual machines;

receive a selection made by the user in the user interface of a selected implementation of the plurality of different implementations of the first solution, wherein the selected implementation of the plurality of different implementations of the first solution selects one configuration of the different configurations of virtual machines to implement the first solution;

obtain configuration information relating to a configuration of the selected implementation; and communicate with an endpoint of the first service to allocate a resource of the cloud based on the selected implementation and the configuration information.

13. The non-transitory computer readable medium of claim 12, wherein the plurality of different implementations of the first solution providing the first service further comprise a software as a service (SaaS) implementation of the first solution, a platform as a service (PaaS) implementation of the first solution, and an infrastructure as a service (IaaS) implementation of the first solution.

14. The non-transitory computer readable medium of claim 12, wherein the plurality of solutions comprise multiple solutions selected from among a publishing solution to provide a publishing service, a database solution to provide a database service, and an email solution to provide an email service.

15. The non-transitory computer readable medium of claim 12, wherein the instructions are executable by the system to:

identify the endpoint to communicate with based on information collected, the information collected including information of the selected implementation and the configuration information.

16. The non-transitory computer readable medium of claim 15, wherein the instructions are executable by the system to:

retrieve information of an application programming interface ("API") from an interface gathering system; and allocate the resource via the API based on the configuration information.

17. The non-transitory computer readable medium of claim 16, wherein the instructions are executable by the system to:

place the configuration information into a configuration payload accessible by the first service; and send the configuration payload to the endpoint.

18. The non-transitory computer readable medium of claim 17, wherein the configuration payload comprises a virtual machine image based on the configuration information.

19. The non-transitory computer readable medium of claim 12, wherein the specific set of operations of the first solution providing the first service comprises operations provided by an application.

* * * * *